(12) United States Patent
Jamil et al.

(10) Patent No.: US 6,344,233 B1
(45) Date of Patent: Feb. 5, 2002

(54) METHOD OF PRODUCING A PHOSPHOR SCREEN

(75) Inventors: Fauzia Jamil, King of Prussia; Peter K. Soltani, West Chester, both of PA (US)

(73) Assignee: Institute for Radiological Image Sciences, Inc., Frederick, MD (US)

( * ) Notice: Subject to any disclaimer, the term of this patent is extended or adjusted under 35 U.S.C. 154(b) by 0 days.

(21) Appl. No.: 09/648,647

(22) Filed: Aug. 28, 2000

Related U.S. Application Data

(62) Division of application No. 09/040,315, filed on Mar. 18, 1998, now Pat. No. 6,110,398, which is a division of application No. 08/720,980, filed on Oct. 15, 1996, now Pat. No. 5,772,916.

(51) Int. Cl.$^7$ .............................. B05D 5/12; B05D 5/06
(52) U.S. Cl. ...................... 427/65; 427/157; 427/160; 427/565
(58) Field of Search ..................... 427/565, 65, 157, 427/160

(56) References Cited

U.S. PATENT DOCUMENTS

| | | | | | |
|---|---|---|---|---|---|
| 3,040,202 A | * | 6/1962 | Lehmann | ..................... | 313/483 |
| 4,617,468 A | * | 10/1986 | Shiraishi et al. | ......... | 250/484.4 |
| 4,830,875 A | * | 5/1989 | Lindmayer | ................... | 427/69 |
| 5,132,043 A | * | 7/1992 | Deboer | ................ | 252/301.4 R |
| 5,378,897 A | * | 1/1995 | Suzuki | ..................... | 250/484.4 |

* cited by examiner

*Primary Examiner*—Shrive P. Beck
*Assistant Examiner*—Michael Cleveland
(74) *Attorney, Agent, or Firm*—Lowe Hauptman Gilman & Berner, LLP

(57) ABSTRACT

Making a phosphor screen by forming a phosphor powder that incorporates strontium, is made up of particles having a long dimension of less than about 5 microns and having superior response time. Slurrying the phosphor powder with a suitable solvent, dispersant, plasticizer and binder. Coating a suitable substate with an infra red absorbing layer. Coating the phosphor containing slurry onto the infra red absorbing layer. Drying the thus produced screen.

11 Claims, 4 Drawing Sheets

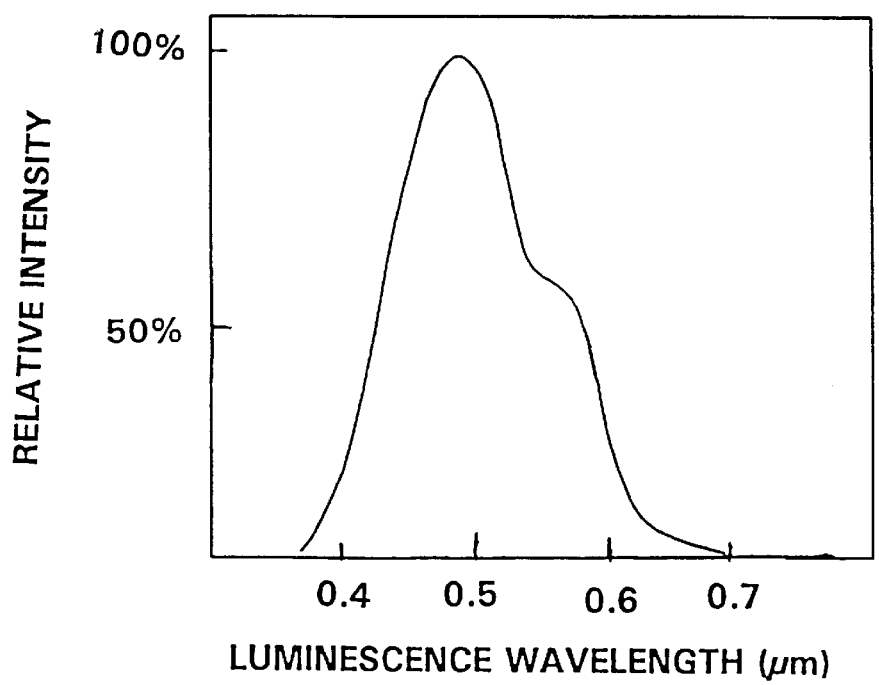
Prior Art        FIG. 4
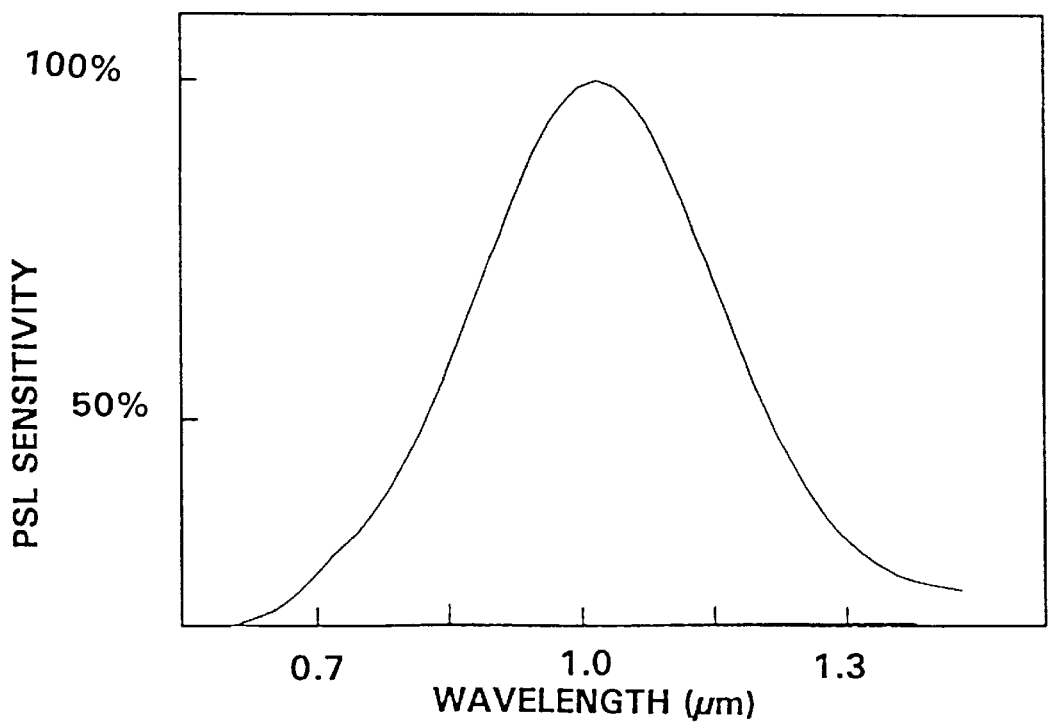
Prior Art        FIG. 5

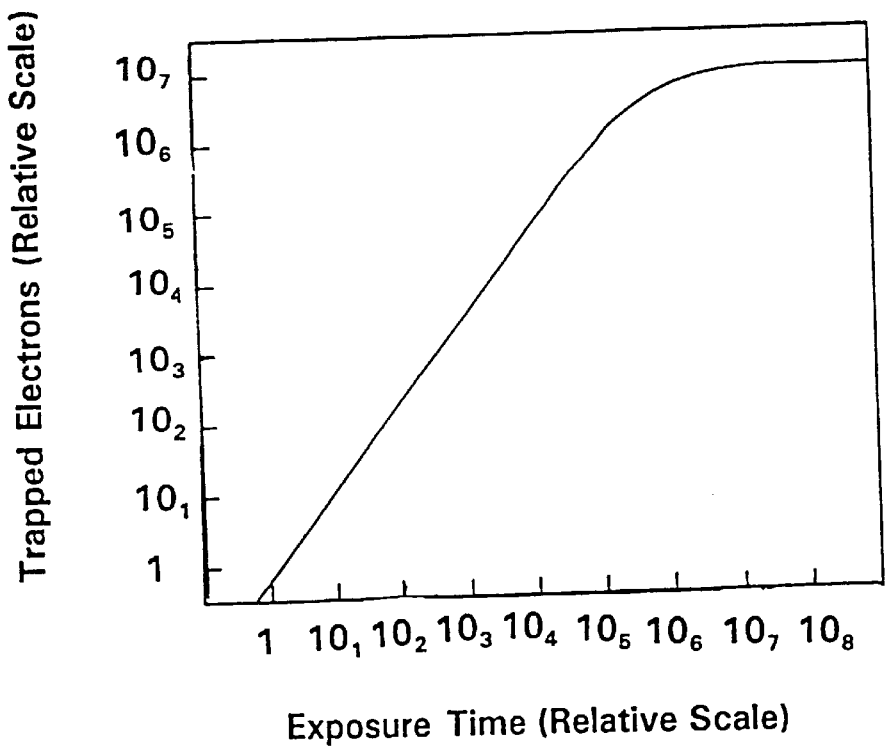
Prior Art  FIG. 6
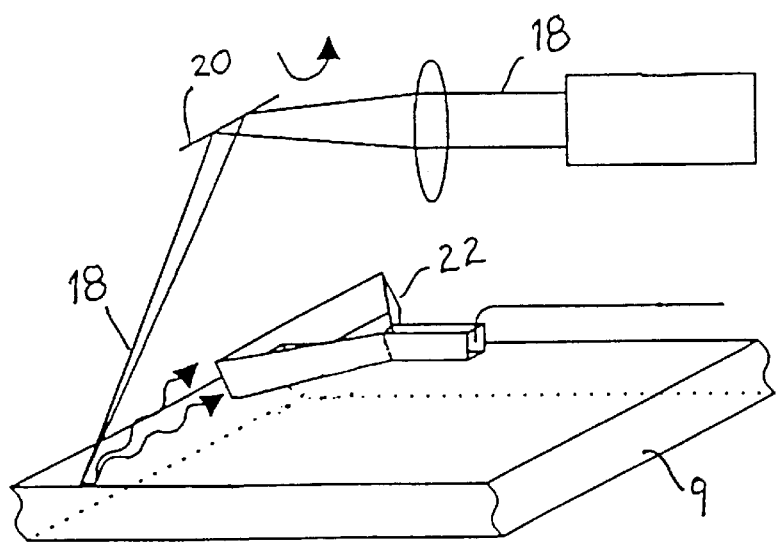
Prior Art  FIG. 7

METHOD OF PRODUCING A PHOSPHOR SCREEN

This application is a division of application Ser. No. 09/040,315, filed Mar. 18, 1998, now U.S. Pat. No. 6,110,398, which is a division of application Ser. No. 08/720,980, filed Oct. 15, 1996 now U.S. Pat. No. 5,772,916.

BACKGROUND OF THE INVENTION

It is well known to use photoluminescent storage phosphor screens (hereinafter referred to as a "phosphor screen") for various purposes, including computed radiography. Such phosphor screens may be created by applying a phosphor layer onto a substrate which may be formed of a polymeric material. The phosphor screens include materials capable of trapping electrons when exposed to ionizing radiation energy.

The phosphor screens typically include a thin, flexible substrate which can be coated with a layer of phosphor powder. A schematic representation of a typical phosphor screen 9 in shown in FIG. 1. In FIG. 1, a phosphor layer 10 is situated on top of a substrate 12. A protective layer 14 covers the top of the phosphor layer 10. Phosphor grains or particles 16 can be found throughout the phosphor layer 10. Such phosphor screens, when exposed to radiation photons, are capable of storing an image, or spatially varying energy pattern, by trapped electrons. The screens undergo a reversible alteration of the electronic state of the screen when they are exposed to the radiation photons. The state is reversed by mildly exposing the screen to infrared photons, which is accompanied by emission of more photons within the wavelength range of the visible spectrum. Thus, the phosphor screen can absorb the radiation pattern, store the information as trapped electrons, and later be read optically by converting the stored radiation pattern to a visible pattern.

Most phosphor screens include a phosphor composition which uses a base material such as strontium sulfide (SrS) crystalline material. One such screen is available from Liberty Technologies, Inc. of Conshohocken, Pa. The crystalline material is doped with trace amounts of rare earth ions, for example, as in the Liberty Technologies' composition, cerium ions ($Ce^{3+}$) and samarium ions ($Sm^{3+}$). The strontium sulfide, when doped with the rare earth ions, generates new energy levels within the crystalline lattice. The function of the ions in the crystal lattice will now be described in further detail.

The ions consist of a nucleus of protons and neutrons, surrounded by outer electrons. The electrons surrounding the nucleus can only occupy certain energy levels which can each accommodate a fixed number of electrons. Electrons can undergo transition between levels if the levels are only partially filled. Transition of an electron from a lower energy level to a higher energy level requires an absorption of energy by the electron. Transition of an electron from a higher energy level to a lower energy level requires an emission of energy by the electron. With respect to the rare earth ions, the 4f level is only partially filled, but is surrounded by electrons in higher energy levels. As such, the electrons can undergo transition, for example, the 4f electrons can move to the higher 5d level. The energy difference between the 4f and the 5d levels is similar to visible light energy such that the 4f electrons can be excited to the 5d level by absorption of visible light.

As a further example, the 5d electrons can move to the 4f level accompanied by the emission of light. These transitions are shown in FIG. 2 in which the nucleus N is shown with respect to the corresponding energy levels $L_1$, $L_2$, $L_3$, $L_4$, and $L_5$. The energy E provided to the 4f level in the form of visible light causes the shift of an electron to the 5d level, and the emission of photons P causes the shift of an electron from the 5d to the 4f level.

When the rare earth ions are introduced within the crystalline lattice, the energy level configurations change due to interaction between the ions' electron energy levels with the electron energy levels of the strontium sulfide crystal. Further, the electrons of the rare earth ion energy levels may interact with each other. Examples of such interactions are shown in FIG. 3. As shown, when the crystal is exposed to ionizing radiation, electrons from the valence band are excited to the conduction band. The movement of the electron leaves behind a net positive charge, or "hole". The electron and hole are referred to as an "electron-hole pair". Electron-hole pairs are movable within the lattice, however, due to the potential barriers, the pair generally remains bound as it travels through the lattice. The bound pair is known as an "exciton".

Excitons are long-lived in strontium sulfide and can migrate through the lattice for some time before recombining and neutralizing each other. Such excitons preferentially recombine at distortions such as at the occurrence of a cerium ion within the lattice. The energy generated from the recombined pair is transferred to the cerium ion which results in excitation of the cerium ions' ground level 4f electron to a 5d level. Once in the 5d level, it can either move back to 4f, or tunnel to a neighboring samarium ion. The probability that this will happen increases with the number of available samarium ion sites near the cerium ions. Once the exchange of electrons takes place, the cerium ion ($Ce^{3+}$) becomes $Ce^{4+}$, and the samarium ion ($Sm^{3+}$) becomes $Sm^{2+}$. This process is referred to as "electron trapping". The cerium is the luminescent center, and the samarium is the "trap". By creating a population of trapped electrons in the phosphor screen, a latent image is created.

The trapping process is reversed by stimulating electrons trapped at $Sm^{2+}$ sites with external energy as shown in FIG. 3. The energy to move the trapped electron to an excited state is about 1 eV which is equivalent to about a 1 $\mu$m wavelength photon. The optical-stimulation wavelength range for a strontium sulfide crystalline lattice doped with cerium and samarium is shown in FIG. 5 which shows the peak sensitivity at 1 $\mu$m in the near-infrared (NIR) region.

Once in the excited state, the electron can tunnel back to its $Ce^{4+}$ neighbor and drop its energy level to create luminescence, properly referred to as "photostimulated luminescence" or "PSL". The intensity of the PSL is directly proportional to the number of trapped electrons which is proportional to the amount of radiation energy absorbed by the phosphor screen.

In the absence of a neighboring samarium ion, the cerium electron from the recombined excited pair in the 5d level would likely move back to the 4f level, generating visible photons. This process is known as prompt luminescence or "fluorescence". The luminescence spectrum for the cerium ion is shown in FIG. 4.

The rate at which electron trapping occurs depends upon the rate at which the various trapping steps take place, including exciton generation; exciton recombination at cerium ion sites; transition between the 4f and 5d energy levels of the cerium ion; tunnelling between cerium and samarium ions; and electron movement from the $Sm^{2+}$ excited state to the ground state. The rate at which excitons are generated, and therefore, the number of excitons, is proportional to the rate of radiation energy absorption, i.e., the dose rate. Most of the trapping steps occur very fast in comparison with the rates of exciton generation and recombination. As such, the rate equations which best express the rate of electron trapping are as follows:

$$\frac{dn_e}{dt} = f - n_e(N-n)A \quad \text{(I)}$$

$$\frac{dn}{dt} = n_c(N-n)A \quad \text{(II)}$$

wherein, f is the exciton generation rate, $n_e$ is the number of excitons generated, N is the number of available trapping sites, n is the number of trapped electrons and A is the transition coefficient for trapping, i.e., A provides the probability with which trapping may occur. Equations (I) and (II) are solved to yield Equation III below for the build up of trapped electrons:

$$n_{(t)} = N[1 - \exp(-ft/N)] \quad \text{(III)}$$

wherein ft=γD, D is the radiation dose and γ is the proportionality factor. By plotting the number of trapped electrons, n, against exposure time (dose, D), it can be seen that the number of trapped electrons increases linearly until the traps have been saturated as shown in FIG. 6.

Once the latent image is stored as trapped electrons according to the above described occurrences, the image must be "read" by stimulating the trapped electrons with NIR photons to create visible luminescence and to render an image which can be observed or electronically recorded. The rate at which this occurs is dependent upon the rates of absorption of photons by the $Sm^{2+}$ions and excitation of trapped electrons; tunnelling of electrons from the $Sm^{2+}$ excited state to a neighboring $Ce^{4+}$ion; and movement from the $Ce^{3+}$ion 5d to 4f level and emission of luminescence. The rate of tunnelling and movement and emission are very fast in comparison with the rate of absorption of photons and excitation of trapped electrons. Therefore, the rate at which luminescence is emitted, i.e., luminescence intensity, is approximately equal to the rate at which trapped electrons-are stimulated with photons as described in Equation (IV):

$$\frac{dn}{dt} = \sigma I \quad \text{(IV)}$$

wherein, σ is the infrared photon capture efficiency of the $Sm^{2+}$ions, and I is the infrared intensity absorbed by the phosphor, and σI is the time constant for emptying the traps.

Once the phosphor screen absorbs energy, the visible luminescence pattern, i.e. the image, must be converted to a permanent, easily viewable format. As shown in FIG. 7, a phosphor screen 9 is scanned with a laser beam 18 and only a small volume of the phosphor layer is photostimulated at any given time. The remaining areas are left undisturbed. The scanning mirror 20 is digitally controlled to the precise laser beam position on the screen. The PSL intensity from the small phosphor area is then measured with a light sensor, for example, a photomultiplier tube 22 which converts the light into electrical current. The current is converted to voltage and digitized. The digital voltage value is stored in computer memory as a function of the x-y coordinates on the screen 9. The process of reading each small portion is repeated across the entire screen 9.

The scanning process is very dependent upon the scanning speed. The time constant, σI of the phosphor, as described above, should be much faster than the scanning speed. After the laser leaves a given small area, known as a "pixel", the photostimulated luminescence should drop to a negligible level to avoid creating an afterglow or image haziness known as "lag." Lag reduces image quality which creates problems particularly with high resolution scanning. During high resolution scanning, the number of pixels is increased, requiring a longer time to complete scanning. If the phosphor does not have a sufficiently high response time constant, a high resolution scan will take unacceptably long to complete, which limits the practical usefulness of such a screen. As such, there is a need in the art for a phosphor composition having a high response time constant and which reduces lag to facilitate the ability of a phosphor screen to be scanned in high resolution scanning processes. For high resolution scanning, the preferred speed is about 1 μs/pixel.

In preparing a phosphor screen, the response time constant of the phosphor, or speed with which the screen will respond as well as the sensitivity of the phosphor, and thereby the scanning speed and the image quality, are influenced by a variety of factors including the choice of the substrate, the thickness of the layer and the nature of the phosphor layer.

As a beam passes deeper through the phosphor layer, the scattering events increase. Further, the phosphor particles have the ability to absorb and to scatter the beam such that the particles can also affect the efficiency with which visible luminescence created in the phosphor layer is able to escape from the phosphor layer to form an image, i.e., it effects exposure time. The longer it takes for the image to appear, the longer the exposure time of the screen. Phosphor layers having increased thickness allow for deeper penetration of the beam and an increased generation of luminescence such that less radiation is required to generate an image. However, deep penetration also increases scattering and can contribute to a reduction in image quality. The substrate can also effect image quality. Reflection from the substrate provides additional scattering and stimulation of phosphor material away from the point of incidence of the beam on the phosphor layer such that image quality is reduced and lag is created. There is a need in the art for a phosphor screen which has a phosphor layer and substrate which reduce lag and provide good image quality at high resolution and under fast scanning speeds.

One prior art process of providing a phosphor screen for use in radiography is described in U.S. Pat. No. 4,855,603. A phosphor composition containing a base material is formed from an alkaline earth metal sulfide, specifically strontium sulfide, a first dopant which is samarium to provide electron trapping sites, and a second dopant which may be cerium oxide, cerium fluoride, cerium chloride and cerium sulfide. The composition may also include a lithium fluoride fusible salt and a barium sulfate component to provide an improvement to emission efficiency. This patent further teaches that cesium halide may be provided to the mixture to improve the light output intensity, i.e., the emission efficiency.

The phosphor screen is made by grinding and homogenizing the mixture of components and heating the components in a nitrogen atmosphere to between 950–13000° C. for 30 minutes to an hour to form a fused mass. The mass is cooled and ground to a powder having particle sizes ranging from 5 to 100 microns. The particle size distribution is wide and the majority of the preferred particles selected for further processing are in the range of about 28–34 microns. Those collected fine particles less than about 10 microns are removed as "scrap," and reprocessed in the composition to achieve higher particle sizes after fusing.

After grinding, some form of etching of the crystals must be done to remove metal deposited on the crystals from grinding. One part of cesium iodide per 100 parts of the total composition is added, and the composition is reheated below fusing temperature at about 700° C. for about 10 to about 60 minutes to regenerate the crystals and repair crystal damage. The material is then cooled and mixed with an acrylic, polyethylene or other organic polymer binder and applied as a coating of between 100 and 500 microns in thickness on a substrate. The substrate may be transparent or opaque and formed of clear plastic, aluminum oxide, glass, paper or other solid substance.

In producing a phosphor screen according to the prior art, in order to generate visible images from stimulation by infrared light, the particles are typically ground to a particle size of from 10 to 100 microns absent some form of particle evaporation or sputtering technique. Typical grinding processes used for forming the phosphor compositions used in phosphor screen formation include use of ball mills which use metallic or ceramic balls, e.g., alumina balls. Use of ball mills and other various mechanical grinding apparatus in prior art processes creates substantial contamination of the phosphor composition and damage to phosphor crystals.

Other phosphor screens such as that of U.S. Pat. No. 5,378,897 include a stimulable, divalent europium-activated barium fluorohalide phosphor coated on a support which may also include a metal oxide capable of reflecting stimulating rays. The screen is formed by dispersing the reflective metal oxide in a binder and solvent, and applying it evenly to the surface of a substrate. The europium-based phosphor is then combined with a binder and dispersed in a solvent. The dispersion is applied to a second releasable substrate and compressed on the reflective layer. The second releasable substrate is removed leaving the phosphor layer on top of the reflective layer.

Prior art phosphor screens, such as those described above are suitable for low speed usage. However, to achieve high resolution images, the number of pixels to be read must be increased. Increasing the number of pixels also increases the amount of time necessary to read the total number of pixels. However, an increase in scanning time to read a high number of pixels, particularly for industrial applications, is undesirable, unless the scanning speed is also significantly increased. Most radiography applications require as fast a reading time as possible. In order to increase the number of pixels which need to be scanned, and to maintain or improve industry acceptable scanning times, the scanning speed must necessarily also be increased, preferably about one-hundred-fold from scanning speeds used for prior art, low-resolution phosphor screens. However, when scanning speed is increased to such a high degree, prior art phosphor screens exhibit a significant reduction in resolution and sensitivity, and image lag is created. The lag, as described above, encountered with prior art phosphor screens is manifested by a hazy or fuzzy image when reading at fast scanning speeds. The hazy images are difficult to read when viewing the image initially recorded on the screen.

There is a need in the art for an improved phosphor screen which can be read at very fast scanning speeds of about 5 $\mu$s/pixel, or as fast as 1 $\mu$s/pixel, but which does not show significant lag when read by illuminating the recorded image with stimulating light.

BRIEF SUMMARY OF THE INVENTION

The present invention relates generally to a method of preparing a high-resolution, reusable, flexible photoluminescent phosphor screen for storage of radiation energy capable of use in digital radiographic imaging applications.

It has now been discovered by using the process of the present invention that significant improvements in reduction of lag can be achieved by reducing or eliminating contamination to the powder during processing and by achieving a narrower particle size distribution in which a substantial amount of the particles in the phosphor powder have a particle size as measured in the longest dimension of greater than 0 and less than 5 microns, and preferably less than 3 microns.

It has also now been discovered that the contamination inherent in prior art processes affects the image clarity of the images derived from reading the phosphor screen using infrared light to stimulate the phosphor. As such, by minimizing the degree of contamination according to the present invention, image clarity is improved and lag is reduced.

It has further been discovered that by using the present invention, the effects of lag can be minimized as the particle size distribution is narrower and particle size is smaller, particularly for radiographic applications. Narrow particle size distribution is difficult to achieve using prior art processes which include mechanical grinding to achieve large particle sizes and wider particle size distributions in which "fines" are generally considered as scrap and/or those processes which regenerate the phosphor crystals at high temperatures for short periods of time. By using special grinding techniques, narrowing the particle size distribution and using a lower temperature regeneration which occurs over a longer period of time, lag can be substantially eliminated and high resolution phosphor screens for radiographic applications may be achieved.

The present invention includes a method for preparing a phosphor powder for producing a high resolution phosphor screen. The method comprises preparing a phosphor composition, and sintering the composition in an inert atmosphere to a temperature of from about 1050° C. to about 1200° C. to form phosphor ingots. The ingots are ground to form a powder, wherein a substantial amount of the particles in the powder have a particle size as measured in the longest dimension of greater than 0 and less than about 5 microns. The powder is reactivated by heating the powder in an inert atmosphere to a temperature of from about 500° C. to about 550° C. A suspension of the powder and a nonreactive organic solvent is prepared and mixed to separate the particles of the powder which partially fuse during reactivation and to break up large agglomerates of the powder in the suspension. The suspension is then decanted to at least partially separate the nonreactive inorganic solvent and the powder. The powder is dried to form the phosphor powder for producing a phosphor screen.

The invention also includes, in another embodiment, a method of producing a phosphor screen. The method comprises preparing a phosphor powder in which a substantial amount of the particles in the powder have a particle size as measured in the longest dimension of greater than 0 and less than about 5 microns. A binder solution is prepared which comprises a plasticizer, a solvent and binder. A phosphor slurry is formed by mixing the binder solution, a solvent, a dispersant and the phosphor powder. A black infrared-absorbing substrate is then coated with the slurry to form a phosphor screen. The screen is dried to remove the solvent.

In another embodiment, the invention includes a method of producing a phosphor screen which comprises preparing a phosphor powder in which a substantial amount of particles in the powder have a particle size as measured in the longest dimension of greater than 0 and less than about 5 microns. A binder solution comprising a plasticizer, a solvent and a binder is prepared. A phosphor slurry is then formed by mixing the binder solution, a solvent, a dispersant and the phosphor powder. A substrate is coated with an infrared-absorbing layer which comprises at least one infrared-absorbing compound. The infrared-absorbing layer is then coated with the phosphor slurry to form the phosphor screen, and the screen is dried to remove the solvent.

The invention also includes a phosphor screen which comprises a black infrared-absorbing substrate and a phosphor layer coated on the substrate, wherein the phosphor layer comprises a phosphor powder in which a substantial amount of the particles in the powder have a particle size as measured in the longest dimension of greater than 0 and less than about 5 microns.

In another embodiment, the invention includes a phosphor screen which comprises a substrate, an infrared-absorbing layer coated on the substrate, and a phosphor layer coated on the infrared-absorbing layer, wherein the phosphor layer comprises a phosphor powder in which a substantial amount of particles in the powder have a particle size as measured in the longest dimension of greater than 0 and less than about 5 microns.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of better understanding the invention, there are shown in the drawings schematic and graphical information intended to provide background information in the art. It should be understood, however, that the invention is not limited by the precise configurations shown in the drawings. In the drawings, like numerals are used to indicate like elements throughout.

In the drawings:

FIG. 4 is a graphical representation of the luminescence spectrum of a cerium ion ($Ce^{3+}$) dopant in a samarium crystal lattice;

FIG. 5 is a graphical representation of the optical stimulation wavelength range for a strontium sulfide crystalline lattice doped with cerium and samarium ions;

FIG. 6 is a graphical representation of the relationship between the number of trapped electrons, n, and the radiation dosage, D as expressed in reference to exposure time; and FIG. 7 is a schematic representation of an apparatus for scanning a phosphor screen.

DETAILED DESCRIPTION OF THE INVENTION

Figure 1:
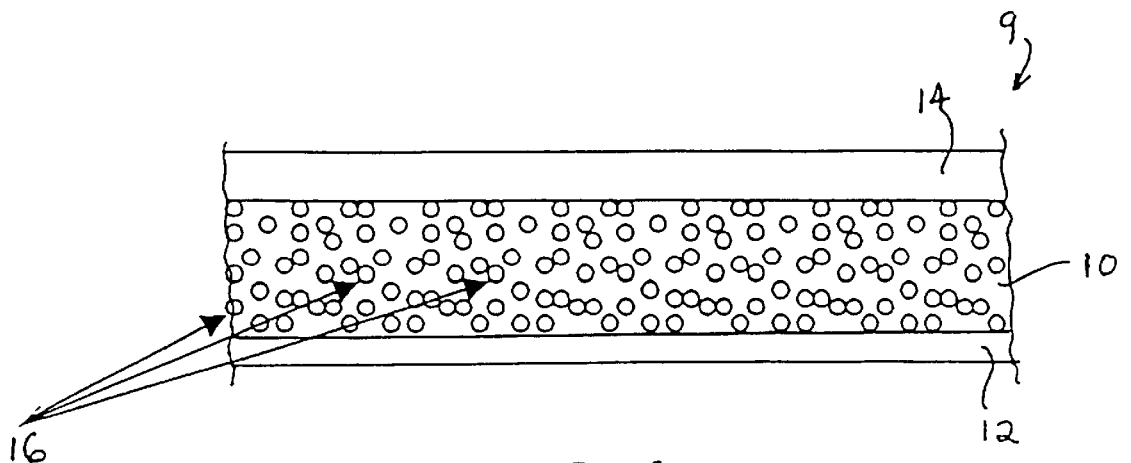
FIG. 1 is schematic cross sectional representation of a typical prior art phosphor screen.
Figure 2:
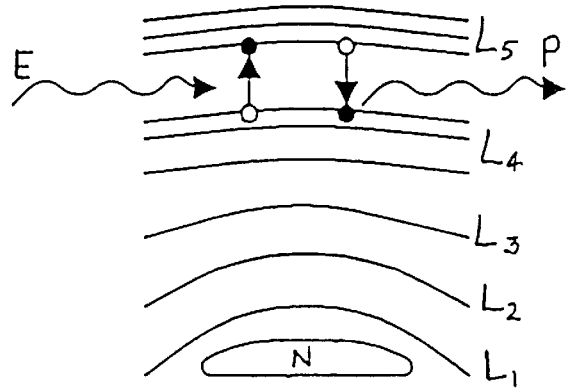
FIG. 2 is a schematic representation of movable energy states of a rare earth ion.
Figure 3:
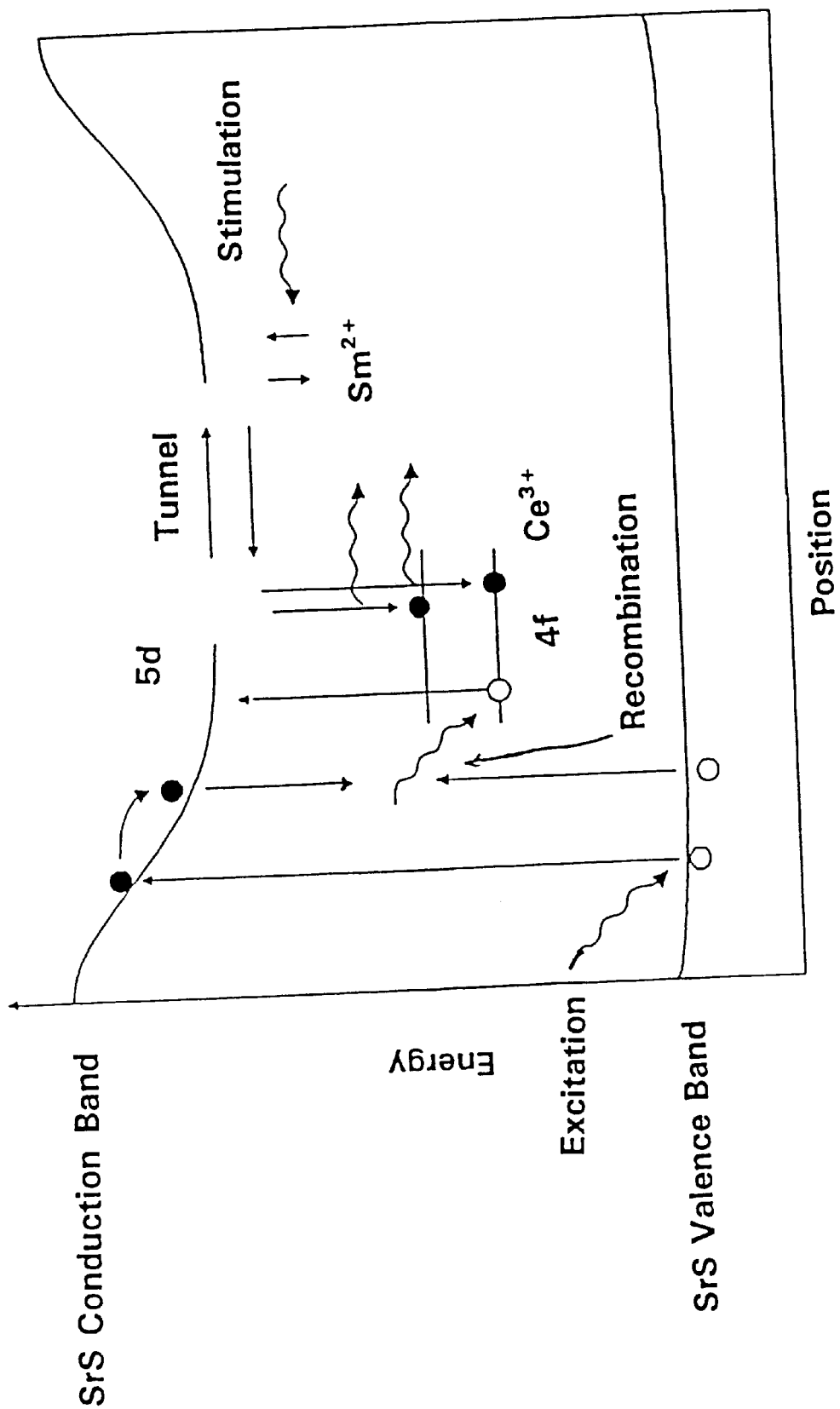
FIG. 3 is a graphical representation of the change of energy levels within a strontium sulfide crystalline lattice containing cerium and samarium ions as dopants.

The process of the present invention significantly reduces lag at high scanning speeds for high resolution imaging by reducing or eliminating contamination to the phosphor powder during processing, minimizing crystal damage and by achieving a narrower particle size distribution in which a substantial amount of the particles, and preferably substantially all, of the particles in the phosphor powder have a particle size, which is greater than 0 and less than about 5 microns, and preferably less than about 4 microns. As used herein, "particle size" is intended to be a measure of individual particles as taken in the longest dimension of the particle. Further, reference to "mean particle size" is intended to mean the mean, or average, value of the particle size of all particles. In addition, in preferred embodiments of the present invention, the image sharpness is further enhanced by use of a black, infrared-absorbing substrate and/or an infrared-absorbing layer also capable of reflecting visible light with a phosphor layer to minimize back-scatter and shadowing. If a black substrate is used, the infrared-absorbing layer is optional. However, if a standard substrate is used, the infrared-absorbing layer functions to minimize back-scatter and shadowing.

In preparing the phosphor screen, first a phosphor composition must be prepared. The composition is prepared by carefully weighing each of the components in the composition and combining them by any suitable method, preferably in a dry, inert atmosphere, such as in the presence of nitrogen, argon and the like. Any suitable phosphor composition may be used in the present invention if the composition includes a photoluminescent material capable of trapping electrons when exposed to radiation energy as described above. However, it is preferred that the composition be suitable for radiographic use.

The base material for the phosphor composition is a compound containing an element from groups II–VI of the periodic table, preferably, the base material is strontium sulfide. The base material is preferably present in an amount from about 90% to about 99% by weight of the phosphor composition. The base material is mixed with first and second dopants, and at least one fusible salt. The composition is mixed by any acceptable mixing procedure preferably by using an alumina ball mill at a slow speed with a minimum number of balls to avoid grinding and to use the mill primarily to gently combine the powders. In addition, other, slow speed or gentle mixing apparatus, such as V blenders may be used. The composition is preferably mixed in a sealed, airtight container. Once the composition is homogeneously mixed, the composition may be loaded on boats, such as alumina or graphite boats for sintering. Preferably, graphite boats are used.

The first and second dopants are rare earth elements from the lanthanide series. Preferably the first dopant is samarium or a compound containing samarium (Sm), most preferably samarium oxide ($Sm_2O_3$). The first dopant is preferably present in an amount of from about 0.0025% to about 0.1% by weight (about 25 to about 1,000 ppm). The second dopant is preferably cerium (Ce) or a cerium compound, most preferably cerium sulfide ($Ce_2S_3$) present in an amount of from about 0.0025% to about 0.2% by weight (about 25 to about 2,000 ppm). It is further preferred that the first and second dopants be combined such that the ratio of elemental samarium to elemental cerium is from about 1:5 to about 1:10, and preferably about 1:5.

A fusible salt is preferably added to the phosphor composition. Preferred salts include lithium fluoride, lithium carbonate, lithium sulfide and other fusible salts having similar properties. Most preferably, the fusible salt is either lithium fluoride, lithium carbonate or a combination of these two salts. The fusible salt is preferably added in an amount of from about 0.1% to about 4% by weight of the phosphor composition.

In addition to the fusible salt, other components can be added to the composition to modify the photoluminescent properties including optional fusible salts such as those listed above, other base materials or brighteners which may be used in amounts of from about 1% to about 5% by weight such as calcium sulfide, barium carbonate or barium sulfate. While cesium halide may be used, it is preferred that cesium halide, a prior art intensity enhancer, not be added to the composition because it may reduce emission or the sensitivity of the phosphor.

Once the phosphor composition is weighed and prepared, it is loaded in a boat, such as a graphite boat and covered with a plate, such as a graphite plate. The composition is then sintered in an inert atmosphere, preferably under a nitrogen feed, to form phosphor ingots. The composition is preferably sintered at ambient pressure. Preferably, the phosphor is sintered in a furnace and a solid state reaction occurs which forms a crystal matrix. The phosphor composition is preferably first subjected to a drying phase in the furnace at a temperature of from about 100° C. to about 300° C., preferably from about 120° C. to about 140° C., to remove substantially all moisture from the phosphor composition prior to sintering the composition at a higher temperature. Failure to remove a sufficient amount of moisture prior to sintering may damage the phosphor and interfere with crystal formation due to the moisture sensitivity of the phosphor composition. It is preferred that the temperature profile and drying and sintering times for the furnace be controlled in order to better control crystal formation. The temperature preferably increases at a rate of about 5° C./minute until the preferred drying temperature is achieved. Then the composition is held at a constant temperature for a period of about 1 to about 4 hours, preferably about 2 hours.

Once the drying phase is complete, the temperature is increased at about the same rate (5° C./minute) until an acceptable sintering temperature is achieved which is from about 1050° C. to about 1200° C., and preferably from about 1120° C. to about 1130° C. Most preferably, the sintering temperature is about 1125° C. The phosphor is sintered at the sintering temperature for a period of preferably about 1 to about 4 hours, preferably for about 2 hours. The phosphor composition is cooled at a rate of about 5° C./minute until the phosphor temperature is below 100° C., and preferably below about 70° C., thereby forming phosphor ingots.

After firing, the phosphor crystals form, and, from this point forward, great care must be taken to ensure minimum physical damage and reduce possible contamination to the crystals to achieve a high resolution phosphor screen. The ingots are ground to form a powder wherein a substantial amount, and preferably substantially all, of the particles in the powder to have a particle size greater than 0 and less than about 5 microns. The ingots are preferably first carefully broken into pieces small enough to feed into the grinding apparatus with a clean, dry implement, which is preferably non-metallic, such as a mortar and pestle or similar tool.

In the preferred embodiment of the method of the present invention, the ingots, preferably after being broken as described above, must then be ground to fine powder. However, in order to obtain a suitable particle size for feeding into the throat of a fluid energy mill for grinding to a fine particle size, as described below, the powder should preferably be initially ground in a first grinding process to break up larger pieces of the ingots to provide substantially all of the particles in the powder with a particle size of greater than 0 and no greater than about 250 microns. A suitable mill for such preliminary grinding is a Brinkman ZM1 centrifugal mill.

The preliminarily ground particles from the first grinding process are fed into the feed throat of a fluid energy mill in order to avoid contamination and damage to the crystals. The fluid energy mill, or a similar apparatus, such as an air-driven apparatus, prevents direct contamination, for example, from metallic parts, and significantly reduces shear damage to the particles caused by typical grinding mills, by forcing the particles to collide with each other by air pressure. The particles collide at a high rate of speed and are broken down into very fine particles. A suitable fluid energy mill for the second grinding process is an Alpine AFG Model 100, available from Germany.

In the second grinding process in the fluid energy mill, the powder is preferably ground at a high speed, from about 6,000 to about 16,000 rpm, and more preferably from about 14,000 to about 16,000 rpm. The second grinding process continues until a substantial amount, and preferably, substantially all, of the particles in the powder have a particle size of greater than 0 and less than about 5 microns, and preferably until all of the particles have a particle size of greater than 0 and less than about 4 microns. Preferably, the particles are ground until at least 60%, more preferably 80%, or even 90%, of the particles have a particle size of greater than 0 and less than about 5 microns. Preferably, the mean particle size of the ground powder is greater than 0 but no greater than about 3 microns.

In the preferred method, etching is not performed on the ground powder as it is not necessary due to the fluid energy mill grinding procedures of the present invention which minimize shear damage to the crystals.

Once the ingots have been ground, the crystals must be reactivated to remove any residual crystal damage from the grinding process. Because mechanical damage is minimal in this process, the reactivation step is more efficient than in prior art processes. During reactivation, by using a lower optimal reactivation temperature for a longer period of time, the reactivation procedure will contribute substantially to developing an optimal particle size distribution and will improve phosphor sensitivity and significantly reduce lag. The growth rate and formation of the crystals is dependent upon the reactivation temperature. In prior processes for forming phosphor powders, this temperature is believed to be most beneficial when it is as high as possible but below the sintering temperature, in order to produce large crystals and fuse smaller crystal grains forming larger grains. However, as described below, applicants preferred method includes maintaining a low reactivation temperature for a longer period of time in order to control the crystal grain growth. The growth rate thereby is decreased making control of the growth process possible in order to achieve smaller crystals in accordance with the present invention which contribute to reducing lag.

Preferably, the powder is reactivated in a two-step heating procedure in an inert atmosphere. The temperature is preferably gradually increased at rates such as those used in the sintering procedure. The powder is first dried at a temperature of about 100° C. to about 300° C., preferably from about 120° C. to about 140° C. to remove substantially all moisture from the powder. The powder is then heated below the sintering temperature, preferably at a temperature from about 500° C. to about 550° C., more preferably from about 525° C. to about 550° C. for a period of time sufficient to achieve the preferred particle size distribution ranges as shown in Table 1 below. Preferably, the powder is heated for a period of from about 3.5 to about 4.5 hours, and more preferably for about 4 hours, and then cooled to room temperature.

TABLE 1

| Particle Size Range (microns) | Percentage of Particles (%) |
| --- | --- |
| 0–1 | 26.2–44 |
| 1–2 | 7–12 |
| 2–5 | 26.2–44 |
| 5–8 | 0–40 |

Preferably, the particle size distribution is such that particles from 5–8 microns approach 0 and particles from 0–1 micron are present in an amount of 44%, particles from 1–2 are present in an amount of 12% and particles from 2–5 are present in an amount of 44% in order to achieve a mean particle size which is no greater than 3 microns. It should be understood that the above particle size distribution of Table 1 is preferred, and other particle size distributions are within the scope of the invention provided a substantial amount of the particles, preferably at least 60%, and more preferably 80% or even 90% of the particles are less than 5 microns.

The reactivated powder is then combined with a nonreactive organic solvent to form a suspension. The solvent may be any nonreactive organic solvent, for example, methanol, propanol, butanol, isopropyl alcohol, methylethylketone, methylene chloride, ethylene chloride, acetone, methylisobutylketone, methyl acetate, ethyl acetate, butyl acetate, dioxane, ethylene glycol monoethylether and ethylene glycol monoethyl ether and similar solvents. Most preferably, the solvent is isopropyl alcohol.

Preferably, the solvent is provided in an amount sufficient to thoroughly wet the powder and to achieve at least a colloidal-type suspension. The suspension should be mixed by stirring with a non-metallic stirrer, preferably by an ultrasonic probe, to gently mix the suspension without damaging or contaminating the crystals. The mixing also aids in separating particles which may have partially fused during reactivation and in breaking up large agglomerates of powder. The suspension is then decanted to at least partially separate the solvent and the powder. Preferably the steps of forming a solvent suspension, mixing and decanting are repeated several times, as necessary, to achieve a wet powder which, when dry, has a substantial amount of particles, and preferably, substantially all of the particles, at a particle size of greater than 0 and less than about 5 microns.

The suspension is preferably processed by decanting through a sieve or other separation device in order to separate agglomerated wet phosphor powder of a size greater than about 20 microns from the smaller agglomerates and particles which are collected in a tray or other container. The larger agglomerates should be further solvated and processed by stirring and then decanted again. This procedure should be repeated several times and the sieve and collection tray dried in an inert atmosphere. The larger agglomerates can be re-processed by recycling those agglomerates to the initial firing step prior to grinding as described above. The remaining fine particles in a wet or dampened state are collected and dried for producing a phosphor screen as described below. The powder may be dried in any conventional oven, however, it is preferred that the powder be dried in an inert atmosphere.

The preferred method of producing a phosphor screen of the invention includes preparing a phosphor powder in which a substantial amount of the particles, and preferably substantially all of the particles, in the powder have a particle size of greater than 0 but less than about 5 microns. The powder is preferably the phosphor powder described above with respect to the phosphor powder according to the present invention. The powder is also preferably formed in accordance with the preferred method as described above. However, it should be understood based on this disclosure that other phosphor powders, for example, those using various other base materials, dopants or fusible salts such as those disclosed in U.S. Pat. No. 4,621,196 or 4,855,603 which are herein incorporated by reference, may be used in the method of the present invention, provided the particles are ground to achieve the preferred particle size and, more preferably, processed to produce the desired particle size distribution as described above.

A binder solution is then prepared which includes a plasticizer, a solvent and a binder. The plasticizer is preferably a phthalate-based plasticizer, for example, phthalic acid ester. A suitable plasticizer is available as Santicizer® 160 from Monsanto Chemicals. The plasticizer and binder should be selected to minimize moisture due to the moisture sensitivity of the phosphor powder. However, a sulfonamide, phthalate-based compounds such as phthalic acid ester, phosphoric acid ester, trimellitates, alcohol, ether or ketone or any plasticizer having similar properties may also be used. The plasticizer may be present in various amounts depending upon the particular phosphor composition being used and the desired screen characteristics. However, optimally, the plasticizer should be from about 40% to about 60% by weight, preferably about 50% by weight, of the binder solution.

The solvent may be any nonreactive, compatible, organic solvent, such as those listed above for use in the method of preparing a phosphor powder for forming the suspension of the powder after reactivation. The solvent should be provided in an amount which provides the desired Theological properties for achieving the desired phosphor coating thickness. Preferably, the solvent is methylethylketone, and is present in the binder solution in an amount from about 15% to about 25% by weight, and preferably about 17% by weight of the binder solution.

The binder may be any binder compatible with the plasticizer and with the phosphor powder which minimizes moisture absorption. The binder is preferably acrylic although other binders such as natural polymers, including gelatin, and other organic polymers, such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, polyester, and polyethylene may also be used. The binder may be present in various amounts depending upon the desired coating characteristics. However, it is preferred that the binder be present in an amount of from about 25% to about 35% by weight, preferably about 30% by weight, of the binder solution.

A phosphor slurry is then formed by mixing the binder solution with a solvent, a dispersant and phosphor powder to form a phosphor slurry. The slurry is preferably formed by first dissolving the dispersant in the solvent. The solvent may be selected from any of the solvents useful for forming the binder solution and may be the same or different from the solvent used for forming the binder solution, provided, the solvents are compatible with each other and with the remaining components. Preferably, the solvent in the phosphor slurry is the same as that of the binder solution. More preferably the solvent in the slurry is methylethylketone. The dispersant may be any suitable dispersant, for example, a polymeric dispersant. Preferably the dispersant is Hypermer®, or KD-1® available from ICI Americas, Inc.

The phosphor powder is added gradually while ultrasonically mixing the solvent and the dispersant at a slow speed. The phosphor powder should be added very gradually to the solution in order to prevent harming the crystals and forming agglomerates. The binder solution is then added gradually to the combined phosphor powder and solution of dispersant and solvent to form the slurry. While adding the binder and phosphor powder to the slurry, it is preferred that the slurry be continuously mixed by an ultrasonic probe or other non-metallic, low-shear mixing apparatus to avoid contamination and to avoid crystal damage.

The components of the slurry may be varied in amounts to achieve preferred rheological properties for coating the slurry on a substrate. However, it is preferred that the binder solution is present in an amount of from about 10% to about 20% by weight, preferably about 15% by weight of the total slurry composition. The solvent is preferably present in an amount of from about 15% to about 35% by weight, preferably about 30% by weight of the slurry composition. In addition, the slurry composition preferably also comprises from about 0.5% to about 1.5% by weight dispersant, more preferably about 1% by weight dispersant, and from about 60% to about 85% by weight, more preferably about 75% by weight of the phosphor powder.

The phosphor slurry is then coated on a black infrared-absorbing substrate to form a phosphor screen. The substrate may be any suitable polymeric substrate having infrared-absorbing capacity, but is preferably formed of a polycarbonate material, such as LEXAN® available from GE Plastics. The substrate is preferably flexible such that it may be wrapped around objects such as piping or other equipment for infrared imaging and other radiographic applications. By using an infrared-absorbing substrate, infrared light passing through the phosphor layer is not reflected back such that the scattering effect is minimized. Such a scattering effect is generally caused by infrared light which reflects off of the substrate causing further activation of the phosphor particles in the coating to create back-scatter, or a shadowing effect, in the illuminated image as described in the Background section above. Use of the infrared-absorbing substrate helps eliminate scattering to achieve a sharper image.

While it is preferred that a black-infrared absorbing substrate as described above is used for forming a phosphor screen according to the present invention, if an infrared-absorbing layer, as described below, is provided between the substrate and the phosphor layer, any flexible substrate suitable for radiographic applications may be used.

The screen should preferably be cured in an inert atmosphere such as under a nitrogen flow in order to evaporate a substantial portion of the solvent in the slurry prior to heating. The cured screen is heated to dry the slurry on the substrate at temperatures from about 70° C. to about 105° C. The screen may also be allowed to dry at room temperature. Once the screen is dried, it may be cut to the size and shape suitable for a particular application.

In a preferred embodiment of the method of making a phosphor screen according to the present invention, the substrate is coated with an infrared-absorbing layer prior to coating with the phosphor slurry. Preferably, the infrared-absorbing layer is also capable of reflecting visible light such that visible light generated within the phosphor layer which may otherwise be diminished due to scattering within the phosphor layer is reflected back to improve luminescence intensity. The infrared-absorbing layer preferably includes a binder, such as the binder used in forming the phosphor slurry, and an infrared-absorbing compound, which may be any infrared-absorbing compound, including dyes and ytterbium (Yb)-containing compounds such as ytterbium oxide ($Yb_2O_3$), and any other filler components which do not otherwise affect the infrared-absorbing properties of the layer. Preferably the compound also contributes to reflection of visible light. The infrared-absorbing layer may also include a solvent such as the solvents used in forming the phosphor coating.

The infrared-absorbing layer of the present invention, preferably reflects visible light and absorbs infrared light such that scattering of light by particles in the coating and possible reflection by the substrate causing shadowing is minimized. Further, in a preferred embodiment in which a black, infrared-absorbing substrate is used, any infrared light which may pass through the infrared-absorbing layer is also absorbed by the substrate and back-scattering is substantially eliminated. Further, visible light is reflected by the infrared-absorbing layer to improve intensity. If such a black, infrared-absorbing substrate is used, however, the infrared-absorbing layer is optional.

Another alternative structure within the scope of the invention includes use of a white or visible light-reflective substrate which is coated or otherwise treated with one or more infrared-absorbing dyes such that the substrate is capable of reflecting visible light to improve intensity, and the dyes function to absorb infrared radiation which could otherwise contribute to back-scatter. Any suitable infrared-absorbing dye may be used.

In a preferred embodiment of the present invention, a protective transparent overcoat may be provided over the phosphor coating on the screen. The overcoat should be formed of a material which does not interfere with the passage of infrared or other radiation energy through the phosphor screen. Preferably, the overcoat is formed of an acrylic-based material or similar protective coating materials. A suitable overcoat material is Aclar®. Such an overcoat layer is preferred for preventing absorption of excessive moisture by the phosphor screen and preventing damage to the phosphor coating.

The phosphor screen according to the present invention preferably includes a black, infrared-absorbing substrate, such as the substrate described above in the method for producing a phosphor screen. However, if an infrared-absorbing layer is provided, any suitable substrate for forming a phosphor screen may be used. A phosphor layer is coated on the substrate by any suitable coating method. The phosphor layer comprises a phosphor powder in which a substantial amount, and preferably substantially all, of the particles have a particle size of greater than 0 and less than about 5 microns, and preferably less than 4 microns. The phosphor layer may include a phosphor powder, binder, dispersant and other components such as those described above with respect to the methods of the present invention. However, it should be understood, based on this disclosure, that other phosphor layer components which would not affect the image sharpness or high-resolution capabilities of the present invention may be substituted or added to the phosphor layer.

The phosphor powder can be formed by any process in which the ingots are ground to form a powder wherein a substantial amount, and preferably substantially all, of the particles in said powder have a particle size of greater than 0 and less than about 5 microns. However, it is preferred that the phosphor powder be formed in a process which minimizes exposure to deleterious contaminants after the ingots have been sintered such that degradation is minimized or eliminated. It is further preferred that the phosphor powder be formed without mechanical grinding by a process in which air or other similar fluid means of grinding is used which minimizes crystal damage caused by shear forces, provides a more uniform particle size and a narrower particle size distribution. The phosphor powder is also preferably formed using a wet sieving procedure, and using a low temperature reactivation procedure to improve and narrow the particle size distribution, and to substantially reduce lag. It is most preferred that the phosphor powder be formed in accordance with the method described in detail above. However, it should be understood, based on this disclosure, that the invention is not limited by the precise method steps described, but also includes variations which are capable of producing particles having the preferred narrow particle size distribution, and in which a substantial amount, and preferably substantially all, of the particles have a particle size of greater than 0 and less than about 5 microns in order to provide a high resolution phosphor screen.

The invention will now be described with respect to the following non-limiting examples:

EXAMPLE I

A phosphor composition including the composition corresponding to Example I as shown in Table 2 below for each of Examples I–III was made and sintered in an inert atmosphere under nitrogen feed at 1025° C. in an electric furnace for a period of 60 minutes to form ingots.

TABLE 2

| Phosphor Component | Example I (wt %) | Example II (wt %) | Example III (wt %) |
|---|---|---|---|
| Strontium Sulfide (SrS) | 99.48 | 94.9 | 99.48 |
| Lithium Fluoride (LiF) | 0.5 | 2.5 | 0.5 |
| Barium Sulfate ($BaSO_4$) | — | 2.5 | — |
| Samarium Oxide ($Sm_2O_3$) | 0.0025 | 0.005 | 0.0025 |
| Cerium Sulfide ($Ce_2S_3$) | 0.0123 | 0.025 | 0.123 |

The ingots were broken to small pieces with a mortar and pestle and then ground in a Brinkman ZM1 centrifugal mill to a particle size of less than 250 microns. To insure that substantially all particles were less than 250 microns, the particles were dry sieved through an 80 mesh screen and those particles remaining on the screen were reprocessed in the Brinkman mill.

The particles were then fed to the feed throat of an Alpine AFG Model 100 fluid energy mill and ground at 16,000 rpm at 80 psi pressure until the particle size distribution shown in Table 3 below was achieved with a mean particle size of 1.10 microns.

TABLE 3

| Particle Size (microns) | Percentage of Particles (%) |
|---|---|
| 0–1 | 78% |
| 1–2 | 12% |
| 2–4 | 10% |

The particles were then reactivated in a furnace at a temperature of 500° C. for 4 hours with a drying cycle at 140° C. The reactivated phosphor was suspended in isopropyl alcohol by stirring with an ultrasonic probe. The suspension was decanted, wet sieved and dried and the particle size determined to be as shown below in Table 4 and a mean particle size of 2.85 microns.

TABLE 4

| Particle Size (microns) | Percentage (%) |
|---|---|
| 0–5 | 90 |
| 5–8 | 10 |

The dried phosphor powder was then formed into a slurry containing the components in the amounts as set forth in Table 5 below.

TABLE 5

| Component | Weight Percentage (%) |
|---|---|
| Phophor | 71 |
| Binder (B72) | 5 |
| Solvent (methyl ethyl ketone) | 18 |
| Plasticizer (Santicizer ® 160) | 5 |
| Dispersant (KD1) | 1 |

A black, flexible polymeric substrate formed of LEXAN® polycarbonate was then coated using a standard tape casting method with the phosphor slurry. The screen was dried at 75° C. for 30 minutes and then an acrylic overcoat was applied to the phosphor layer. The screen was cut to a size of 7 inches by 10 inches using a die cutter.

EXAMPLE II

A phosphor composition was made in accordance with the percentage composition set forth in Table 2 above and sintered in an inert atmosphere under nitrogen feed at 1125° C. in an electric furnace for a period of 60 minutes to form ingots. The ingots were broken to small pieces with a morter and pestle and then ground according to the process described in Example I in a Brinkman mill. The particles were then fed to the feed throat of the Alpine fluid energy mill and ground at 14,000 rpm at 75 psi pressure until the particle size distribution shown in Table 6 below was achieved with a mean particle size of 2.3 microns.

TABLE 6

| Particle Size (microns) | Percentage of Particles (%) |
|---|---|
| 0–1 | 40 |
| 1–2 | 12 |
| 2–4 | 44 |
| 4–5 | 8 |

The particles were then reactivated in a furnace at a temperature of 525° C. for 6 hours with a drying cycle at 140° C. The reactivated phosphor was suspended, decanted, sieved and dried as described in Example I and the following particle size distribution as shown in Table 7 was achieved with a mean particle size of 3.85 microns.

TABLE 7

| Particle Size (microns) | Percentage (%) |
| --- | --- |
| 0–5 | 68 |
| 5–8 | 38 |

The dried phosphor powder was then formed into a slurry containing the components in the amounts as set forth in Table 8 below.

TABLE 8

| Component | Weight Percentage (%) |
| --- | --- |
| Phosphor | 68 |
| Binder (B72) | 4 |
| Solvent (methyl ethyl ketone) | 21 |
| Plasticizer (Santicizer ® 160) | 6 |
| Dispersant (KD1) | 1 |

A black, flexible polymeric substrate was then coated using a standard tape casting method with the phosphor slurry. The screen was dried, coated and cut into a screen as in Example I.

EXAMPLE III

A phosphor composition was made in accordance with the percentage composition set forth in Table 2 above and sintered in an inert atmosphere under nitrogen feed at 1025° C. in an electric furnace for a period of 60 minutes to form ingots in the manner of Example I. The ingots were broken to small pieces with a mortar and pestle and then ground according to the process described in Example I in a Brinkman mill. The particles were then fed to the feed throat of the Alpine fluid energy mill and ground at 16,000 RPM at 80 psi pressure as in Example I until the particle size distribution shown in Table 9 below was achieved with a mean particle size of 1.10 microns.

TABLE 9

| Particle Size (microns) | Percentage of Particles (%) |
| --- | --- |
| 0–1 | 78 |
| 1–2 | 12 |
| 2–4 | 10 |

The particles were then reactivated in a furnace at a temperature of 500° C. for 6 hours with a drying cycle at 140° C. The reactivated phosphor was suspended, decanted, sieved and dried as described in Example I and the following particle size distribution as shown in Table 10 was achieved. The mean particle size was not calculated.

TABLE 10

| Particle Size (microns) | Percentage (%) |
| --- | --- |
| 0–5 | 87 |
| 5–8 | 13 |

The dried phosphor powder was then formed into a slurry containing the components in the amounts as set forth in Example I in Table 5 and formed into a phosphor screen in the same manner described in Example I.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A method of producing a phosphor screen, comprising:
   (a) preparing a phosphor powder, in which a substantial amount of particles in said powder have a particle, size as measured in the longest dimension of greater than 0 and less than about 5 microns, by a method comprising:
      (1) heating a composition comprising:
         a strontium sulfide base,
         a first dopant comprising a source of samarium sufficient to provide about 0.0025% to about 0.1% by weight of samarium as samarium oxide,
         a second dopant comprising a source of cerium sufficient to provide about 0.0025% to about 0.2% by weight of cerium as cerium sulfide, and
         at least one fusible salt;
         wherein the ratio of elemental samarium to elemental cerium is about 1:5 to about 1:10
            in an inert atmosphere t o a temperature of about 1050° C. to about 1200° that is sufficient to enable said dopants to dope said strontium sulfide in an amount sufficient to cause said doped strontium sulfide to become crystals of a phosphor and to form at least one ingot comprising said crystals;
      (2) cooling said ingot;
      (3) subdividing said phosphor ingot, in a manner to insure minimum physical damage and limit contamination of said crystals, to form an at least partially deactivated phosphor powder comprising a substantial amount of particles having a particle size, as measured in the longest dimension, which is greater than 0 and less than about 5 microns;
      (4) heating said powder in an inert atmosphere to a temperature of up to about 550° C. and for a time sufficient to reactivate said at least partially deactivated phosphor and to at least partially agglomerate particles of said powder into larger size particles;
      (5) disrupting said agglomerated particles to form a reactivated powder having a phosphor particle size, as measured in the longest dimension, that is greater than 0 and less than about 5 microns, and
      (6) collecting at least a substantial proportion of said 0 to less than 5 micron, reactivated particles;
   (b) preparing a binder solution comprising a plasticizer, a first solvent and a binder,
   (c) forming a phosphor slurry by mixing said binder solution, a second solvent, a dispersant and said reactivated phosphor powder;
      wherein said first and second solvents are the same or different;
   (d) coating an infrared-absorbing substrate with said phosphor slurry; and
   (e) drying said coated substrate to remove said first and second solvents whereby forming a phosphor screen.

2. The method according to claim 1, wherein said second solvent comprises a non reactive organic chemical; said method further comprising:
   (g) decanting said slurry to at least partially separate said second solvent and said powder.

3. The method according to claim 1, wherein said binder solution comprises an acrylic binder.

4. The method according to claim 1, wherein said plasticizer is selected from the groups consisting of polyester, sulfonamide, phthalic acid ester, phosphoric acid ester, alcohol ether, and ketone.

5. The method according to claim 1, wherein said binder solution comprises about 40% to about 60% by weight of said plasticizer, about 15% to about 25% by weight of said first solvent, and about 25% to about 35% by weight of said binder.

6. The method according to claim 1, wherein said phosphor slurry comprises about 10% to about 20% by weight of said binder solution, about 15 to about 35% by weight of said second solvent, about 0.5 to about 1.5% by weight of said dispersant, and about 60% to about 85% by weight of said phosphor powder.

7. The method according to claim 1, wherein step (c) comprises:

gradually adding said phosphor powder to a first mixture of a second solvent and said dispersant;

ultrasonically mixing said phosphor powder, said second solvent and said dispersant to form a second mixture;

adding said binder solution to said second mixture while mixing the resulting composition to form said slurry; and ultrasonically mixing said slurry.

8. The method according to 1, further comprising coating said substrate with an infrared absorbing layer prior to coating said substrate with said slurry.

9. The method according to claim 8, wherein said infrared absorbing layer comprises at least one infrared absorbing compound selected from the group consisting of dyes, and ytterbium oxide.

10. A method as claimed in claim 1 wherein said first and second solvents are the same.

11. A method of producing a phosphor screen, comprising:

(a) preparing a phosphor powder, comprising strontium doped with an effective amount of about 0.0025 to about 0.2% by weight of cerium, as cerium sulfide, and an effective amount of about 0.0025 to about 0.1% by weight of samarium as samarium oxide and a ratio of elemental samarium to elemental cerium of about 1:5 to about 1:10, in which said phosphor powder a comprises a substantial proportion of particles having a particle size, as measured in the longest dimension, of greater than 0 and less than 5 microns, and wherein said phosphor powder has been produced by a method that includes reactivating an at least partially deactivated, comminuted sinter, comprising said strontium, cerium and samarium, by heating said comminuted material at a reactivating temperature up to about 550° C.;

(b) preparing a binder solution comprising a plasticizer, a first solvent and a binder;

(c) forming a phosphor slurry by mixing said binder solution, said first solvent, a dispersant and said phosphor powder;

(d) coating a substrate with an infrared-absorbing layer comprising at least one infrared absorbing compound;

(e) coating said infrared-absorbing layer with said phosphor slurry; and (f) drying said coated infrared absorbing layer to remove said solvent and thereby form a phosphor screen.

* * * * *